US012313810B2

(12) United States Patent
Tang et al.

(10) Patent No.: US 12,313,810 B2
(45) Date of Patent: May 27, 2025

(54) METHODS AND DEVICES FOR FINE RECONSTRUCTION OF SEDIMENTATION STRUCTURES OF FLUMES

(71) Applicants: CHINA UNIVERSITY OF PETROLEUM (EAST CHINA), Shandong (CN); SHANDONG UNIVERSITY OF SCIENCE AND TECHNOLOGY, Shandong (CN)

(72) Inventors: Mingming Tang, Qingdao (CN); Huifang Ma, Qingdao (CN); Rong Xie, Qingdao (CN); Ruifeng Hong, Qingdao (CN); Chenyang Peng, Qingdao (CN)

(73) Assignees: CHINA UNIVERSITY OF PETROLEUM (EAST CHINA), Qingdao (CN); SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/963,733

(22) Filed: Nov. 28, 2024

(65) Prior Publication Data

US 2025/0093547 A1    Mar. 20, 2025

Related U.S. Application Data

(63) Continuation-in-part of application No. PCT/CN2022/134521, filed on Nov. 26, 2022.

(30) Foreign Application Priority Data

Nov. 11, 2022  (CN) .......................... 202211414437.0

(51) Int. Cl.
*G01V 5/12*  (2006.01)
(52) U.S. Cl.
CPC ..................... *G01V 5/12* (2013.01)

(58) Field of Classification Search
CPC ....................................................... G01V 5/12
See application file for complete search history.

(56) References Cited

U.S. PATENT DOCUMENTS 6,216,540 B1 *  4/2001  Nelson ................. A61B 5/0507
                                                      73/633
6,363,775 B1 *  4/2002  Varkovitzky ........... G01M 3/04
                                                      405/118

(Continued)

FOREIGN PATENT DOCUMENTS

CN          1726870 A       2/2006
CN        204896266 U      12/2015

(Continued)

OTHER PUBLICATIONS

Montreuil, S. and Long, B., "CT-scanning: A New Way to Measure Sediment Transport Inside a Flume", 2009, Proc. International Association of Hydraulic Engineering & Research'09 Conference (Year: 2009).*

(Continued)

*Primary Examiner* — Blake C Riddick
(74) *Attorney, Agent, or Firm* — PORUS IP LLC

(57) ABSTRACT

The embodiment of the present disclosure provides a method and a device for fine reconstruction of a sedimentation structure of a flume. The device includes: a combined bottom plate and a combined freezing flume, wherein the combined bottom plate is formed by tiling and splicing a plurality of equal-thickness and rectangular basic bottom plates, a splicing gap is located between adjacent basic bottom plates, the splicing gap is filled with elastic adhesive, and the filled splicing gap is as thick as the basic bottom plates; the combined freezing flume includes a plurality of local freezing flumes; and each of the basic bottom plates has a local freezing flume that matches the basic bottom plate.

8 Claims, 7 Drawing Sheets

(56) References Cited

U.S. PATENT DOCUMENTS

| | | | |
|---|---|---|---|
| 6,381,298 B2 * | 4/2002 | Proksa | A61B 6/585 378/19 |
| 2003/0082236 A1 | 5/2003 | Mathiowitz et al. | |
| 2006/0023831 A1 * | 2/2006 | Imai | G06T 11/008 378/4 |
| 2019/0360948 A1 * | 11/2019 | Lee | G01N 33/24 |
| 2023/0152484 A1 * | 5/2023 | Chen | E21B 47/111 250/269.3 |
| 2024/0159639 A1 * | 5/2024 | Sun | G01N 15/04 |

FOREIGN PATENT DOCUMENTS

| | | |
|---|---|---|
| CN | 115220101 A | 10/2022 |
| WO | 2012028444 A2 | 3/2012 |

OTHER PUBLICATIONS

International Search Report in PCT/CN2022/134521 mailed on Jun. 15, 2023, 7 pages.

Written Opinion in PCT/CN2022/134521 mailed on Jun. 15, 2023, 7 pages.

"Sedimentary model", Web page <https://balke.baidu.com/item/%E6%82%89%E7%A7%AF%E6%A8%A1%E5%BC%8F/7573021?fr=ge_ala>, Jul. 3, 2024.

"Depositional model", Web page <https://web.archive.org/web/20250213183604/https://eng.geus.dk/energy-resources/deep-and-shallow-geothermal-energy/depositional-model>, Feb. 19, 2020.

* cited by examiner

METHODS AND DEVICES FOR FINE RECONSTRUCTION OF SEDIMENTATION STRUCTURES OF FLUMES

CROSS-REFERENCE

This application is a Continuation-in-part of International Application No. PCT/CN2022/134521, filed on Nov. 26, 2022, which claims the priority of the Chinese application No. 202211414437.0, filed on Nov. 11, 2022, the entire contents of each of which are incorporated herein by reference.

TECHNICAL FIELD

The present disclosure relates to the technical field of a method for fine reconstruction of a sedimentation structure of a flume, and in particular, to a method and a device for fine reconstruction of a sedimentation structure of a flume.

BACKGROUND

In current petroleum exploration and development, the distribution of underground oil and gas reservoirs is primarily predicted based on drilling, logging, and supplemented with seismic data. However, drilling and logging data can only extract geological information within a very small range around the boreholes, and for sparsely populated areas with widely spaced wells, the reservoir features between wells have significant uncertainty that cannot be obtained through drilling or logging data. Further sedimentary pattern analysis is therefore necessary.

On the other hand, predicting the distribution features of sand bodies in thin reservoirs within sparsely populated wells is also crucial for oil and gas exploration and development, as the vertical resolution of seismic data aligns with the thickness range of sand bodies in medium-thin reservoirs. Sedimentary pattern analysis is the key to predicting the distribution features of sand bodies between wells.

By creating small-scale sediment body through flume sedimentation experiments and analyzing the results, the internal structure features of sediment bodies can be obtained. This allows for the fine reconstruction of the sedimentation structure of the flume for the study of sedimentary patterns. Based on the principle of similarity, flume sedimentation experiments can be used to study the sedimentation structures of macroscopic, large-scale sediment bodies and construct sedimentary patterns that can be applied to large-scale reservoir prediction, thus serving the exploration and development of oil fields.

The existing method of fine reconstruction of a sedimentation structure of a flume is mainly a continuous slicing method. It involves making parallel cuts on a model after flume sedimentation experiments using a series of parallel planes to obtain internal and contour information of the cut surfaces. Subsequently, a computer image processing technology is employed to link the information of each cut surface and generate a three-dimensional image. However, the continuous slicing method is time-consuming and can cause deformation of the cut surfaces, leading to a loss in analysis accuracy of the sedimentation structure.

Therefore, it is desired to provide a method and a device for fine reconstruction of a sedimentation structure of a flume that can enhance the accuracy and efficiency of the reconstruction without causing significant damage to the model after the experiments.

SUMMARY

One or more embodiments of the present disclosure provide a device for fine reconstruction of a sedimentation structure of a flume, comprising: a combined bottom plate and a combined freezing flume, wherein the combined bottom plate is formed by tiling and splicing a plurality of equal-thickness and rectangular basic bottom plates, a splicing gap is located between adjacent basic bottom plates, the splicing gap is filled with elastic adhesive, and the filled splicing gap is as thick as the basic bottom plates; the combined freezing flume includes a plurality of local freezing flume s; each of the plurality of local freezing flumes includes: a rectangular flume body with an open bottom and a hollow interior, at least two channels located on a top surface of the rectangular flume body and communicating with the hollow interior, wherein any one of the at least two channels is used for a freezing medium to enter, and another of the at least two channels is used for the freezing medium to flow out, and three metal particles with different diameters located on the top surface of the rectangular flume body at different positions from the two channels; each of the basic bottom plates has a local freezing flume that matches the basic bottom plate, the local freezing flume that matches the basic bottom plate satisfies that: a thickness of the rectangular flume body is sw/2, a length of the rectangular flume body is LL+sw/2, and a width of the rectangular flume body is LW+sw/2, where sw represents a width of the splicing gap located between the adjacent basic bottom plates, LL represents a length of the each of the basic bottom plates, and LW represents a width of the each of the basic bottom plates.

In some embodiments, a size of the each of the basic bottom plates in the combined bottom plate is the same; correspondingly, in the combined freezing flume, a size of the rectangular flume body of the each of the plurality of local freezing flumes is the same.

In some embodiments, a plurality of splicing gaps have a same width, and the width sw satisfies: 0<sw<2 mm.

In some embodiments, the diameters of the three metal particles satisfy: a diameter of any one of the metal particles is pw, then the diameters of the other two metal particles are 2*pw and 4*pw, respectively.

In some embodiments, an elastic coefficient of the elastic adhesive satisfies: when a thickness of a sediment on the flume reaches a maximum thickness of the flume, an elastic deformation of the elastic adhesive is less than 0.0001.

One or more embodiments of the present disclosure provide a method for fine reconstruction of a sedimentation structure of a flume using the device, comprising:
  dividing a sediment body located on the combined bottom plate and completed a flume sedimentation experiment through the plurality of local freezing flumes to obtain a plurality of independent sediment bodies, each of the independent sediment bodies located on the each of the basic bottom plates and covered by the flume body of the local freezing flume;
  recording positions of the independent sediment bodies on the combined bottom plate under a unified coordinate system to obtain a first position relationship, and recording spatial positions of the three metal particles of the local freezing flume to obtain a second position relationship;
  performing quick freezing on the independent sediment body through the local freezing flumes to obtain frozen sediment bodies;
  for each of the frozen sediment bodies, obtaining CT scan data of the frozen sediment body at different rotation angles, and forming a slice dataset of the frozen sediment body from CT scan data within a rotation angle range of 0-360°;

obtaining three-dimensional sedimentary structure data by performing a Jordanian transformation on the slice dataset of the frozen sediment body;

identifying, from the three-dimensional sedimentary structure data, the spatial positions of the three metal particles on the local freezing flume of the frozen sediment body to obtain a third position relationship;

obtaining a correspondence between the three-dimensional sedimentary structure data and the frozen sediment body by aligning the second position relationship and the third position relationship;

splicing three-dimensional sedimentary structure data corresponding to the plurality of frozen sediment bodies according to the first position relationship to obtain a three-dimensional experiment sedimentation structure of the flume.

In some embodiments, the quick freezing is performed based on liquid nitrogen.

In some embodiments, the method further comprises:

dividing a sediment body located on the combined bottom plate and completed a flume sedimentation experiment through the plurality of local freezing flumes to obtain a plurality of independent sediment bodies, each of the independent sediment bodies located on the each of the basic bottom plates and covered by the flume body of the local freezing flume;

injecting the freezing medium through the any one of the at least two channels to quickly freeze the independent sediment body to obtain the frozen sediment bodies, labeling the frozen sediment bodies including:

in a Cartesian coordinate system, recording spatial positions of three mark points formed by three metal particles on a local freezing flume Pi of an i-th frozen sediment body using a laser three-dimensional positioning technology, wherein with a straight edge of the flume as an origin point, a vertical direction as a Z direction, and other two edges as an X direction and a Y direction, a spatial position of a TD mark point is recorded as $Di=\{Pi\_DX, Pi\_DY, Pi\_DZ\}$, a spatial position of a TE mark point recorded as $Ei=\{Pi\_EX, Pi\_EY, Pi\_EZ\}$, a spatial position of a TF mark point recorded as $Fi=\{Pi\_FX, Pi\_FY, Pi\_FZ\}$, where $Pi\_DX$, $Pi\_EX$, and $Pi\_FX$ are coordinates of the three mark points in the X direction, $Pi\_DY$, $Pi\_EY$, and $Pi\_FY$ are coordinates of the three mark points in the Y direction, and $Pi\_DZ$, $Pi\_EZ$, and $Pi\_FZ$ are coordinates of the three mark points in the Z direction;

a coordinate information set $Ci=\{Di, Ei, Fi\}$ of the i-th local freezing flume Pi is composed of the spatial positions of the three mark points Di, Ei and Fi of the i-th local freezing flume Pi; a set of spatial position information of mark points of all N local freezing flumes constitutes a spatial coordinate label set $S=\{Ci|i=1 \ldots N\}$;

putting the i-th frozen sediment body after completing the labeling into a rotating CT scanner, irradiating the frozen sediment body once with a rotation of theta angle, and obtaining scan data Tk under each irradiation as slice data under different rotation angles, after completing a rotation of 360°, obtaining 360/theta pieces of slice data, and forming a slice information set $\{Tk|k=1 \ldots 360/theta\}$ in order;

based on the slice information set, performing the Jordanian transformation to obtain the three-dimensional sedimentary structure data CTi of the i-th frozen sediment body;

identifying coordinate data corresponding to the three mark points from the three-dimensional sedimentary structure data CTi, where a Di point is an origin point, a Di-TE edge is an X-axis, and a Di-TF edge is a Y-axis;

extracting the coordinate information set $Ci=\{Di, Ei, Fi\}$ of the i-th local freezing flume from the spatial coordinate label set $S=\{Ci|i=1 \ldots N\}$, extracting TD mark point coordinate $Di=\{Pi\_DX, Pi\_DY, Pi\_DZ\}$ and TE mark point coordinate $Ei=\{Pi\_EX, Pi\_EY, Pi\_EZ\}$ in the i-th frozen sediment body to form a coordinate system, according to a local coordinate $CT\_Di=\{CTi\_DX, CTi\_DY, CTi\_DZ\}$ of the TD mark point and a local coordinate $CT\_Ei=\{CTi\_EX, CTi\_EY, CTi\_EZ\}$ of the TE mark point identified from the three-dimensional sedimentary structure data CTi, splicing the three-dimensional sedimentary structure CTi to obtain three-dimensional reconstructed body data F of the sedimentation structure of the flume.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
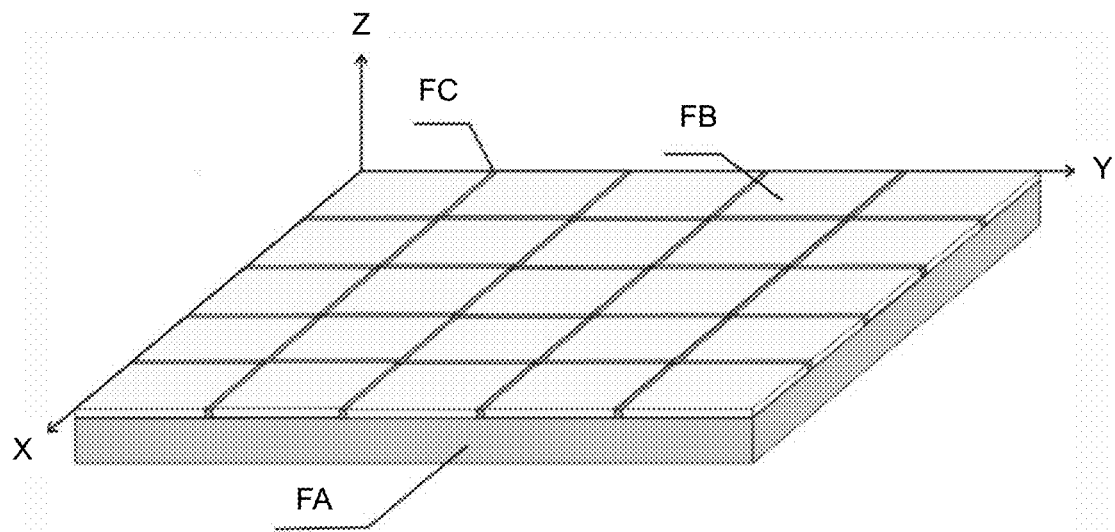
FIG. 1 is a schematic diagram of a laying structure of flume bottom plates according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

The present disclosure is hereinafter described in detail in conjunction with the embodiments and the accompanying drawings, but it is to be understood that the embodiments and the accompanying drawings are only used for exemplary description of the present disclosure, and they do not constitute any limitation on the scope of protection of the present disclosure. All reasonable transformations and combinations encompassed within the scope of the inventive purpose of the present disclosure fall within the scope of protection of the present disclosure.

Figure 2:
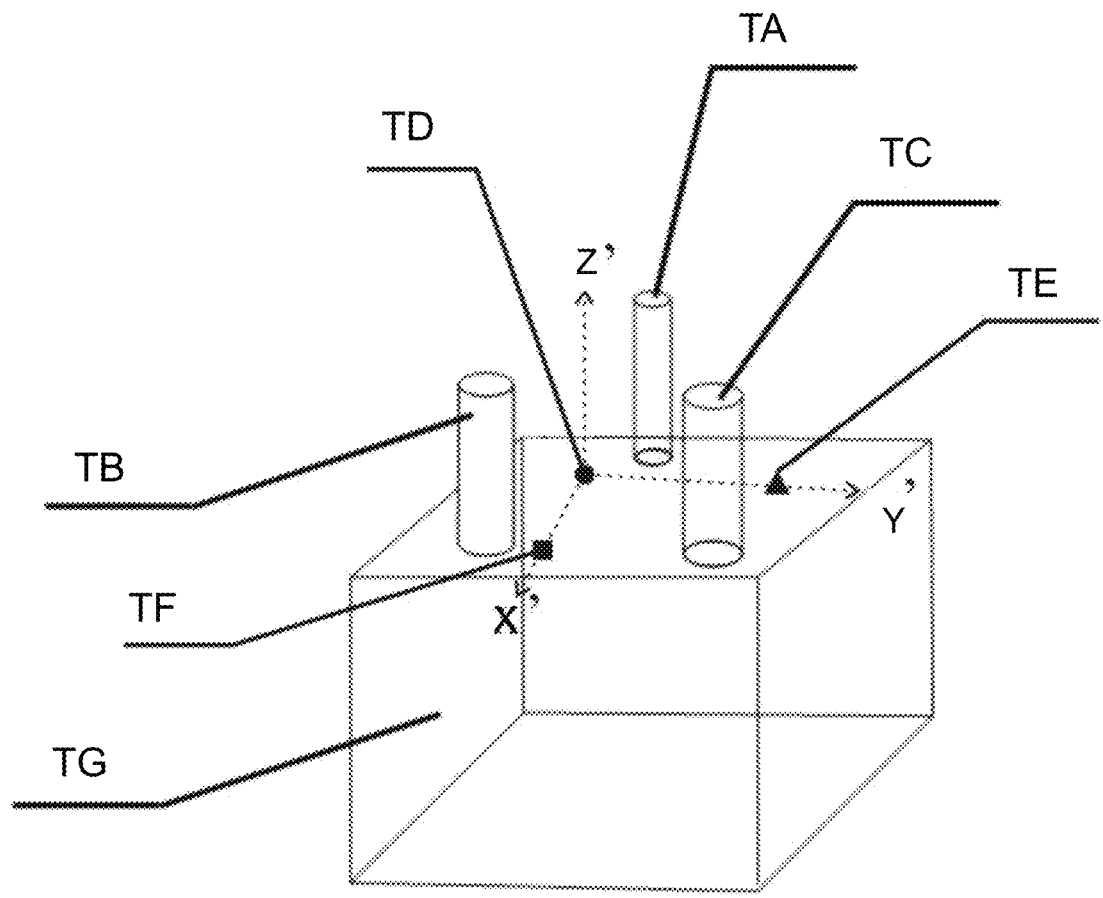
FIG. 2 is a schematic diagram of a structure of a local freezing flume according to some embodiments of the present disclosure.
Figure 3:
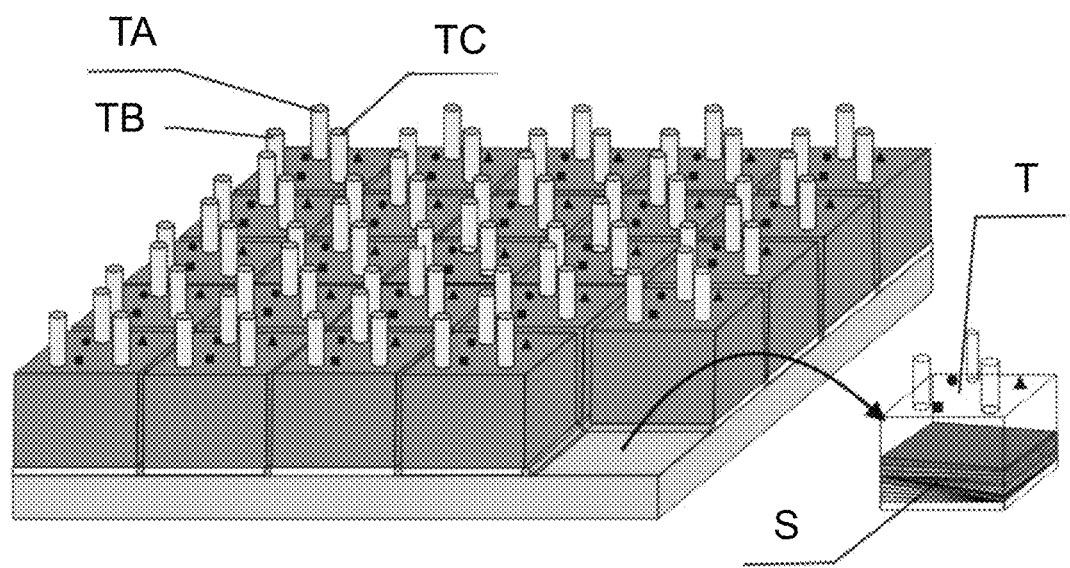
FIG. 3 is a schematic diagram of a process of dividing and freezing a sediment body using a local freezing flume according to some embodiments of the present disclosure.
Figure 4:
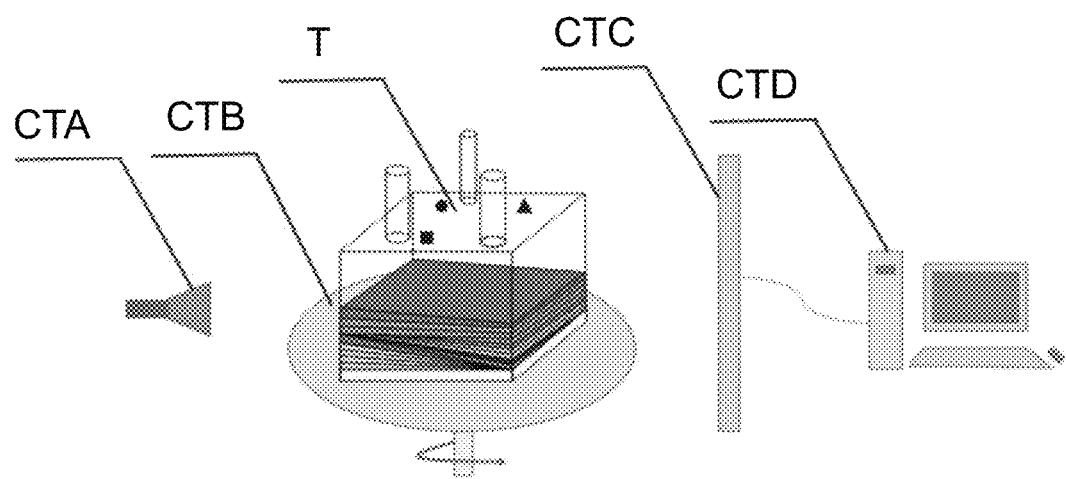
FIG. 4 is a schematic diagram of a CT (Computed Tomography) scanning process of a frozen sediment body according to some embodiments of the present disclosure.
Figure 5:
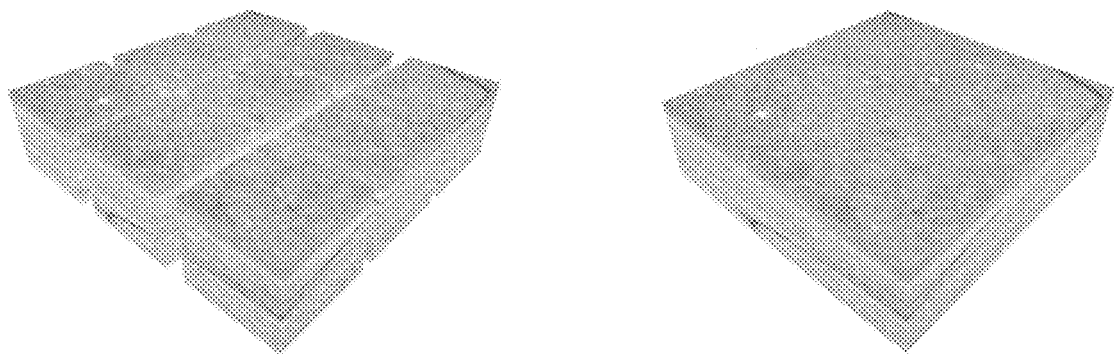
FIG. 5 is a schematic diagram of a local freezing flume for splicing micrometer CT scan data according to some embodiments of the present disclosure.

FIG. 1 is a schematic diagram of a laying structure of flume bottom plates according to some embodiments of the present disclosure. FIG. 2 is a schematic diagram of a structure of a local freezing flume according to some embodiments of the present disclosure. FIG. 3 is a schematic diagram of a process of dividing and freezing a sediment body using a local freezing flume according to some embodiments of the present disclosure. FIG. 4 is a schematic diagram of a CT (Computed Tomography) scanning process of a frozen sediment body according to some embodiments of the present disclosure. FIG. 5 is a schematic diagram of a local freezing flume for splicing micrometer CT scan data according to some embodiments of the present disclosure.

As shown in FIG. 1-5, the present disclosure provides a device for fine reconstruction of a sedimentation structure of a flume. The device includes a flume, a combined freezing flume, and a CT scanner. In some embodiments, the flume includes a combined bottom plate, wherein the combined bottom plate is formed by tiling and splicing a plurality of equal-thickness and rectangular basic bottom plates, a splicing gap is located between adjacent basic bottom plates, the splicing gap is filled with elastic adhesive, and the filled splicing gap is as thick as the basic bottom plates.

The flume is used to perform flume sedimentation experiments. As shown in FIG. 1, the flume includes a flume base FA and a plurality of equal-thickness flume bottom plates FB (i.e., the basic bottom plates).

The flume base FA is used to carry a sediment body formed thereon. The sediment body is an assemblage of sediments generated during a flume sedimentation experiment. In some embodiments, the sediment body may include substances such as sand, mud, clay, or the like. In some embodiments, the flume base FA may have any feasible shaped structure (e.g., triangular, rectangular, etc.). In some embodiments, the shape of the flume base FA may be determined by those skilled in the art based on experience. For example, to facilitate cutting, the flume base FA may be rectangular. In some embodiments, the size of the flume base FA may be obtained based on historical data. For example, a size of a flume base from a historical experiment may be used as the size of the flume base FA. In some embodiments, the size of the flume base FA may also be determined by those skilled in the art. For example, those skilled in the art may set the size of the flume base FA based on experimental needs.

Each of the flume bottom plates FB covers only a localized area of the flume base FA, and after being spliced together, all the flume bottom plates FB equally thickly cover the full area of the flume base FA (i.e., the entire surface of the flume base FA), thereby forming the combined bottom plate. In some embodiments, the size of each of the flume bottom plates FB may be the same. Detailed instructions for determining the size of the flume bottom plate FB can be found below.

There is a splicing gap FC between adjacent flume bottom plates FB. In some embodiments, the splicing gap FC may be filled with elastic adhesive, and the filled splicing gap FC has the same thickness as the flume bottom plates FB.

The elastic adhesive may be any kind of adhesive having a bonding function. For example, the elastic adhesive may be a thermoplastic resin, a soft rubbery adhesive, or the like. In some embodiments, an elastic coefficient of the elastic adhesive needs to satisfy a certain preset condition. The preset condition may be determined based on actual experimental needs. For example, the preset condition may be that an elastic deformation of the elastic adhesive is less than 0.0001 when a thickness of a sediment on the flume bottom plate FB reaches a maximum thickness of the flume. Selecting an elastic adhesive that meets the preset condition may prevent the elastic adhesive from intrinsically affecting the sedimentation process.

In some embodiments, the splicing gap between the adjacent flume bottom plates FB are of the same shape and size. In some embodiments, the splicing gap satisfies a predetermined size requirement. The predetermined size requirement may be that a width sw of the splicing gap is within a preset width range. In some embodiments, the preset width range may be manually preset, e.g., $0 < sw < 2$ mm.

In some embodiments, the combined freezing flume includes a plurality of local freezing flumes; each of the plurality of local freezing flumes includes: a rectangular flume body with an open bottom and a hollow interior, at least two channels located on a top surface of the rectangular flume body and communicating with the hollow interior, wherein any one of the at least two channels is used for a freezing medium to enter, and another of the at least two channels is used for the freezing medium to flow out, and three metal particles with different diameters located on the top surface of the rectangular flume body at different positions from the two channels; each of the basic bottom plates has a local freezing flume that matches the basic bottom plate, and the local freezing flume that matches the basic bottom plate satisfies the following: a thickness of the rectangular flume body is sw/2, a length of the rectangular flume body is LL+sw/2, and a width of the rectangular flume body is LW+sw/2, where sw represents a width of the splicing gap located between the adjacent basic bottom plates, LL represents a length of each of the basic bottom plates, and LW represents a width of each of the basic bottom plates.

The local freezing flume is used to cut a sediment body formed on the flume bottom plates FB into a plurality of independent sediment bodies and freeze the cut independent sediment body to form a plurality of frozen sediment bodies. In some embodiments, a plurality of local freezing flumes may be used. For example, a count of local freezing flumes is the same as a count of flume bottom plates FB. In some embodiments, the size of each of the basic bottom plates are the same in the combined bottom plates; correspondingly, the sizes of the flume bodies of the local freezing flumes are the same in the combined freezing flumes. As shown in FIG. 2, a local freezing flume may include a flume body TG, channels TA, TB, TC, and metal particles TD, TE, TF.

The flume body TG is a rectangular flume body with an open bottom surface and a hollow interior for cutting the sediment body. In some embodiments, the flume body TG is made of high-strength plastic.

The channels TA, TB, and TC are internally connected to the flume body TG. Any of the channels (e.g., channel TA) is used for injection of the freezing medium, and the other two channels (e.g., channels TB, TC) are used for the outflow of the freezing medium after it has been used. Wherein the freezing medium is a medium used to quick freeze the independent sediment bodies; for example, the freezing medium may be liquid nitrogen. In some embodiments, the channels may be a structure projecting out of the top surface of the flume body, e.g., upwardly protruding pipes. In some embodiments, the channels may be a structure recessed toward the flume body, e.g., inwardly protruding pipes. In some embodiments, the channels may be pipes that do not have a particular morphology and are located at an opening on the top surface of the flume body.

The metal particles TD, TE, and TF are located on the top surface of the flume body TG and are in different positions from channels TA, TB, and TC. The metal particles may be used for position labeling because they may form clear mark points in CT scan images. In some embodiments, the type of metal particles is varied, e.g., titanium, barium, or the like. Diameters of the metal particles TD, TE, and TF may be different, e.g., pw, 2*pw, and 4*pw, respectively.

Parameters of the local freezing flume are parameters related to the structure of the local freezing flume (e.g., the length, width, height, etc., of the flume body). In some embodiments, the parameters of the local freezing flume may be obtained based on historical experimental data. For example, the parameters of the local freezing flume selected in the historical experiments with better results may be used as the parameters of the local freezing flume for the current experiment. Exemplarily, the thickness of the flume body TG may be sw/2, the length of the flume body TG may be LL+sw/2, the width of the flume body TG may be LW+sw/2, and the height of the flume body TG may be LH. Wherein the height LH needs to be higher than the maximum thickness of the sediment in the flume, sw denotes the width of the splicing gap, LL denotes the length of the flume bottom plate FB, and LW denotes the width of the flume bottom plate FB.

The CT scanner is used to scan frozen sediment bodies. CT scanning technology utilizes precisely collimated X-rays and extremely sensitive detectors to perform a continuous tomographic scanning around an object to form a three-dimensional image. Depending on different physical resolutions of imaging, CT scanning modalities may be categorized as millimeter CT, micron CT, and nano CT, where a single pixel of the micron CT has a resolution scale in a range of 1-10 microns. In some embodiments, the CT scanning modality may be the micron CT.

As shown in FIG. 4, the CT scanner may include a radiation source CTA, a carousel CTB, an imaging pad CTC, and a computer CTD.

The radiation source CTA is used to emit X-rays for scanning a frozen sediment body T. In some embodiments, the radiation source CTA may include a tube, e.g. a cold cathode ion tube, a high-vacuum hot cathode tube, a rotating anode tube, or the like.

The carousel CTB is used to rotate the frozen sediment body T to obtain CT scan data at different rotation angles. In some embodiments, the carousel CTB may be rotated at random angles. In some embodiments, the carousel CTB may also be rotated at intervals. The intervals may be set as a fixed angle (e.g., a theta angle). Wherein, the theta angle takes a value in the range of 0-360°. In some embodiments, the theta angle may be determined randomly or based on historical data. For example, an average of rotation angles from historical experiments may be used as the theta angle. In some embodiments, the theta angle may also be determined based on an angular model. For descriptions of determining the theta angle based on the angular model, please refer to the relevant content in FIG. 6.

The imaging pad CTC is used to receive X-rays emitted by the radiation source CTA. In some embodiments, the imaging pad CTC may be communicatively coupled to the computer CTD. For example, the imaging pad CTC may convert received optical signals into electrical signals and send the electrical signals to the computer CTD to obtain CT images.

The computer CTD may include at least one processor for transferring and processing information and/or data related to the device for fine reconstruction of a sedimentation structure of a flume. For example, the computer CTD may be connected to the imaging pad CTC to obtain CT scan data, position information of metal particles, or the like. As another example, the computer CTD may calculate the size of the basic bottom plate, the theta angle, or the like. In some embodiments, the computer CTD may be a mobile device, a tablet computer, a laptop computer, etc., or any combination thereof.

In some embodiments, when performing a flume sedimentation experiment utilizing a device for fine reconstruction of a sedimentation structure of a flume of the embodiments of the present disclosure, it is necessary to determine the size of the basic bottom plate and the size of the local freezing flume which are used for the experiment.

In some embodiments, the size of the basic bottom plate and the size of the local freezing flume may be obtained based on historical data. For example, the size of the basic bottom plate and the size of the local freezing flume from the historical flume sedimentation experiment may be used as the size of the basic bottom plate and the size of the local freezing flume used in the current experiment. As another example, an average of sizes of the basic bottom plate and sizes of the local freezing flume from a plurality of historical flume sedimentation experiments may be used as the size of the basic bottom plate and the size of the local freezing flume used for the current experiment.

In some embodiments, the size of the basic bottom plate and the size of the local freezing flume may also be determined based on a size of the flume, experimental variable factors, and an experimental accuracy requirement.

In some embodiments, the size of the flume may be determined based on a manufacturer's production specifications. Different sizes of the flume may be categorized as "large, medium, or small". In some embodiments, the size of the flume may be artificially determined based on a type or purpose of the flume sedimentation experiment. For example, for preliminary experiments, teaching experiments, or the like, smaller-sized flumes may be used; and for complex experiments or experiments with high project specifications, larger-sized flumes may be used.

The experimental variable factors are changeable factors that affect the results of the experiment. In some embodiments, the experimental variable factors may include a sediment component, a water flow rate, or the like.

The sediment component includes at least particulate matter and organic matter. The particulate matter may include sand, mud, minerals, or the like, wherein the minerals may also be subdivided according to type into quartz, feldspar, or the like. The organic matter may include plant debris, algae, animal remains, or synthetic organic matter, which may settle in the water and combine with other sediments. In some embodiments, the experimental variable factors may be obtained based on historical data. For example, a composition detection instrument may be used to detect the composition of sediment formed in historical flume sedimentation experiments, and use the obtained historical sediment component as the sediment component of the current experiment. As another example, a sediment ratio of the historical flume sedimentation experiment may be directly obtained, thereby determining the sediment component. In some embodiments, a real geographic environment corresponding to the simulated environment of the flume sedimentation experiment may be determined, and the sediment in the real geographic environment may be examined, and the examined sediment component may be used as the sediment component of the current experiment.

The water flow rate is a rate of water flow during a formation of the sediment. In some embodiments, the water flow rate may be obtained based on readings from a flow rate sensor.

In some embodiments, the experimental variable factors may also include other factors, e.g., a sediment bottom topography, etc.

In some embodiments, the experimental accuracy requirement may be expressed in any feasible manner. For example, the experimental accuracy requirement may be specified as "low, medium, high," or the like. As another example, the experimental accuracy requirement may be expressed by a level classification (for example, levels 1-5). The higher the level, the higher the experimental accuracy requirement. In some embodiments, the experimental accuracy requirement may be determined artificially by an experimenter. In some embodiments, the experimental accuracy requirement may also be determined based on the type of experiment or the purpose of the experiment. For example, the experimental accuracy requirement for preliminary experiments and teaching experiments may be level 1; and the experimental accuracy requirement for complex experiments may be level 5.

In some embodiments, based on the size of the flume, the experimental variable factors, and experimental accuracy requirement, the size of the basic bottom plate and the size of the local freezing flume may be determined by looking up a table. For example, a corresponding relationship between the size of the basic bottom plate and the size of the local freezing flume and different sizes of the flume, different experimental variable factors, and different experimental accuracy requirements may be manually preset in a preset table. By looking up in the preset table, a target size of the basic bottom plate and a target size of the local freezing flume may be selected as the size of the basic bottom plate and the size of the local freezing flume of the current experiment. A size of the flume, experimental variable factors, and an experimental accuracy requirement corresponding to the target size of the basic bottom plate and the target size of the local freezing flume are the same as that of the current experiment.

In some embodiments, the size of the basic bottom plate and the size of the local freezing flume may also be determined by a target division manner.

The division manner is a manner in which the basic bottom plate is formed. The division manner may include a count and size of basic bottom plates formed by the division. For a complete bottom plate, the greater the count of basic bottom plates divided, the smaller the size of the basic bottom plate. For example, the division manner may include dividing the complete bottom plate into basic bottom plates with a size of 20×20 (mm); dividing the complete bottom plate into 20 basic bottom plates with the same size, etc.

The target division manner is the one selected from different division manners to be applied to the experiment. Since the size of the basic bottom plate correspond to the size of the local freezing flume, the size of the local freezing flume may be determined by determining the size of the basic bottom plate through the target division manner.

In some embodiments, the processor may construct a plurality of feature vectors based on the experimental variable factors and the experimental accuracy requirement, cluster the plurality of feature vectors, determine at least one clustering center based on clustering results, and determine the target division manner based on the feature vectors corresponding to the clustering centers.

In some embodiments, the feature vector constructed based on the experimental variable factors and the experimental accuracy requirement may be expressed as $\vec{m}$=(substance 1, substance 2, . . . , substance n, a water flow rate, an experimental accuracy requirement), wherein substance 1, . . . , and substance n represent sediment components, which are usually commonly used in the flume sedimentation experiments. In some embodiments, substance 1, . . . , and substance n are fixedly set, i.e., each substance is fixedly corresponding to a sediment component. For example, for all feature vectors, substance 1 is sand, substance 2 is mud, etc. The vector element of the each substance may be expressed as a proportion of the substance in all sediment components, e.g., the feature vectors (20%, 0%, . . . , 0.5 m/s, level 3) may be expressed as that: the proportion of sand is 20%, the water flow rate is 0.5 m/s, the experimental accuracy requirement is level 3, and the sediment does not contain mud.

In some embodiments, the processor may cluster a plurality of feature vectors and determine at least one clustering center based on the clustering results. For example, the processor may randomly select one or more feature vectors as the clustering centers, compute vector distances between remaining feature vectors and each of the clustering centers, and when a vector distance is less than a distance threshold, cluster the feature vector corresponding to the vector distance less than the distance threshold into a clustering of the clustering center corresponding to the vector distance less than the distance threshold, and if for a feature vector, there exists a plurality of vector distances that are all less than the distance threshold, the feature vector may be clustered into a clustering corresponding to a smallest vector distance. The above operations may be carried out on all the remaining vectors, and if there exists a feature vector that cannot be clustered into any clustering, the clustering centers may be randomly selected again, and the above operations may be repeated until all the feature vectors have been clustered. Wherein a count of randomly selected clustering centers may be manually preset or may be determined based on a total count of feature vectors, and the greater the total count, the greater the count of clustering centers may be. The distance threshold may be obtained by those skilled in the art based on experience. The clustering algorithm may be various, e.g., K-mean clustering, Density-Based Spatial Clustering of Applications with Noise (DBSCAN), or the like.

In some embodiments, experiments may be performed on different sizes of flumes based on the feature vectors of the clustering centers, and the processor may evaluate the results of the different experiments to determine the target division manner.

In this embodiment, the feature vectors of each clustering center may be applied to three different sizes (i.e., large, medium, and small) of flumes, respectively, to conduct experiments. Different sizes of flumes may correspond to different division manners, i.e., each clustering center corresponds to a variety of division manners. The clustering center corresponds to a variety of division manners. The different division manners corresponding to different sizes of flumes may be randomly generated or determined based on historical data. For example, a historical division manner used in a historical experiment may be used as a division manner for a flume with a same specification in the current experiment. Under each specification for each clustering center, the processor may determine, based on results of the experiments, a division manner that has the best reconstruction effect of the sediment body as the target division manner corresponding to the specification for the clustering center.

In some embodiments, for each specification, the processor may rank the division manners based on the reconstruction effect of the sediment body, and determine the top-ranked (e.g., the top 3) division manners as the candidate division manners, and an experimenter may select a candidate division manner as the target division manner based on experience (e.g., experimental cost, resource loss, etc.).

In some embodiments, when a new experiment is to be performed, the feature vectors of the new experiment may be clustered to determine its corresponding clustering center, and based on the specification of the flume used for the new experiment, determine a target division manner corresponding to the same flume specification in the clustering center as the division manner of the new experiment.

In some embodiments of the present disclosure, based on different sizes of flume, experimental variable factors, and the experiment accuracy requirement, different target division manners may be determined, which facilitate the determination of the appropriate size of the basic bottom plate and the local freezing flume to achieve the best reconstruction effect of the sediment body and improve the accuracy and efficiency of fine reconstruction of the sedimentation structure of the flume.

Some embodiments of the present disclosure provide a method for fine reconstruction of a sedimentation structure of a flume using the device for fine reconstruction of a sedimentation structure of a flume, the method includes the following steps:

dividing a sediment body located on the combined bottom plate and completed a flume sedimentation experiment through the plurality of local freezing flumes to obtain a plurality of independent sediment bodies, each of the independent sediment bodies located on the each of the basic bottom plates and covered by the flume body of the local freezing flume;

recording positions of the independent sediment bodies on the combined bottom plate under a unified coordinate system to obtain a first position relationship, and recording spatial positions of the three metal particles of the local freezing flume to obtain a second position relationship;

performing quick freezing on the independent sediment bodies through the local freezing flumes to obtain frozen sediment bodies;

for each of the frozen sediment bodies, obtaining CT scan data of the frozen sediment body at different rotation angles, and forming a slice dataset of the frozen sediment body from CT scan data within a rotation angle range of 0-360°;

obtaining three-dimensional sedimentary structure data by performing a Jordanian transformation on the slice dataset of the frozen sediment body;

identifying, from the three-dimensional sedimentary structure data, the spatial positions of the three metal particles on the local freezing flume of the frozen sediment body to obtain a third position relationship;

obtaining a correspondence between the three-dimensional sedimentary structure data and the frozen sediment body by aligning the second position relationship and the third position relationship;

splicing three-dimensional sedimentary structure data corresponding to the plurality of frozen sediment bodies according to the first position relationship to obtain a three-dimensional experiment sedimentation structure of the flume.

As further described below in conjunction with the accompanying drawings, the method further includes the following steps:

Step 1: as shown in FIG. 1, before start of a flume sedimentation experiment, a plurality of rectangular and equally thick flume substrate plates FB (i.e., the basic bottom plates) are laid on a rectangular flume base FA of the experimental flume; the flume sedimentation experiment is then performed in the flume after completion of the laying-up process.

Step 2: prior to or during the start of the flume sedimentation experiment, a plurality of local freezing flumes as shown in FIG. 2 are prepared.

Step 3: as shown in FIG. 3, at an end of the flume sedimentation experiment, without drying, and while keeping the sediment body in the flume moist, the local freezing flume is placed on the flume bottom plate FB loaded with a post-experimental sediment S, an edge of one side of the local freezing flume is aligned with an edge of the flume bottom plate FB, and then the local freezing flume is pressed to slowly undercut until the flume bottom plate FB loaded with the post-experiment sediment body S is completely filled with a bottom surface of the flume body of the local freezing flume, thereby obtaining an independent sediment body; a freezing medium is injected into one channel of the local freezing flume to rapidly freeze the independent sediment body, resulting in a frozen sediment body to maintain features of the sediment structure and its morphological stability. For further details on Step 3, refer to the content of FIG. 7.

Repeating the above process, frozen sediment bodies corresponding to all flume bottom plates FB may be obtained using a plurality of local freezing flumes. Each local freezing flume corresponds to a frozen sediment body. Then, a labeling process for all frozen sediment bodies may be performed. The labeling process includes:

in a Cartesian coordinate system, recording spatial positions of three mark points formed by three metal particles on a local freezing flume Pi of an i-th frozen sediment body using a laser three-dimensional positioning technology, wherein with a straight edge of the flume as an origin point, a vertical direction as a Z direction, and other two edges as an X direction and a Y direction, a spatial position of a TD mark point is recorded as Di={Pi_DX, Pi_DY,Pi_DZ}, a spatial position of a TE mark point recorded as Ei={Pi_EX,Pi_EY,Pi_EZ}, a spatial position of a TF mark point recorded as Fi={Pi_FX,Pi_FY, Pi_FZ}, where Pi_DX, Pi_EX, and Pi_FX are coordinates of the three mark points in the X direction, Pi_DY, Pi_EY, and Pi_FY are coordinates of the three mark points in the Y direction, and Pi_DZ, Pi_EZ, and Pi_FZ are coordinates of the three mark points in the Z direction; and a coordinate information set Ci={Di, Ei, Fi} of the i-th local freezing flume Pi is composed of the spatial positions of the three mark points Di, Ei and Fi of the i-th local freezing flume Pi; a set of spatial position information of mark points of all N local freezing flumes constitutes a spatial coordinate label set S={Ci|i=1 . . . N}.

In some embodiment, Step 3 further includes equally transferring the frozen sediment bodies to a flat plate of equal thickness according to an arrangement relationship of the frozen sediment bodies on the flume bottom plates FB of the flume, and then performing the labeling process.

Step 4: as shown in FIG. 4, after the completion of the labeling process, the frozen sediment body T is rotated by the CT scanner for rotational CT scanning at a rotation angle of 0-360°, CT scan data at different rotation angles is obtained, and the Jordanian transformation is performed to obtain the three-dimensional sedimentary structure data CTi of the frozen sediment body based on the CT scan data at different rotation angles.

In some embodiments, Step 4 may further include:
putting the i-th frozen sediment body after completing the labeling into a rotating CT scanner,
irradiating the frozen sediment body once with a rotation of theta angle, and obtaining scan data Tk under each irradiation as slice data under different rotation angles,
after completing a rotation of 360°, obtaining 360/theta pieces of slice data, and forming a slice information set {Tk|k=1 . . . 360/theta} in order;
based on the slice information set, performing the Jordanian transformation to obtain the three-dimensional sedimentary structure data CTi of the i-th frozen sediment body;
identifying coordinate data corresponding to the three mark points from the three-dimensional sedimentary structure data CTi, where a Di point is an origin point, a Di-TE edge is an X-axis, and a Di-TF edge is a Y-axis;

Step 5: extracting the coordinate information set Ci={Di, Ei, Fi} of the i-th local freezing flume from the spatial coordinate label set S={Ci|i=1 . . . N}, extracting TD mark point coordinate Di={Pi_DX,Pi_DY,Pi_DZ} and TE mark point coordinate Ei={Pi_EX,Pi_EY, Pi_EZ} in the i-th frozen sediment body to form a coordinate system, at the same time, from the three-dimensional scan data Di obtained in Step 5, according to relative sizes of the metal particles, determining a local coordinate CT_Di={CTi_DX, CTi_DY, CTi_DZ} of the TD mark point and a local coordinate CT_Ei={CTi_EX, CTi_EY, CTi_EZ} of the TE mark point identified from the three-dimensional sedimentary structure data CTi, splicing the three-dimensional sedimentary structure CTi to obtain three-dimensional reconstructed body data F of the sedimentation structure of the flume according to the above information.

An exemplary process of fine reconstruction of a sedimentation structure of a flume according to Steps 1-5 may include following contents. The flume base was a square with a side length of 200 cm, and the flume bottom plate FB laid on the top surface of the flume base was a square with a side length of 20 cm. The width of the splicing gap embedded between the flume bottom plates FB was 2 mm. The experiment lasted for 12 hours, and the thickest sediment body formed was 2 cm. After the experiment was completed, the sediment body was cut using square local freezing flumes with an inner edge length of 20 cm, a shell thickness of 1 mm, and a height of 6 cm. The diameter of a metal particle at TD mark point on the local freezing flume was 0.5 mm, the diameter of a metal particle at TE mark point was 1.0 mm, and the diameter of a metal particle at TF mark point was 2.0 mm. Then, for each local freezing flume, 1 L of liquid nitrogen was injected through a liquid nitrogen injection port of the local freezing flume, and after waiting for 5 minutes, the sediment in the local freezing flume reached a high degree of freezing and solidification.

Using a laser locator, coordinate information was recorded for all labeled points on the local freezing flumes. After that, micro CT scanning and data splicing were performed on each local freezing flume, resulting in a 3D reconstructed model of the sediment body with an accuracy of 10 μm. Referring to FIG. 5, exemplary images before and after splicing are shown. At the same time, the sediment body which is frozen in each local freezing flume are placed in an insulated box for future usage.

With the method and device for fine reconstruction of a sedimentation structure of a flume shown in some embodiments of the present disclosure, the accuracy and efficiency of fine reconstruction of a sedimentation structure of a flume can be improved without causing high destruction to a post-experimental model.

Figure 6:
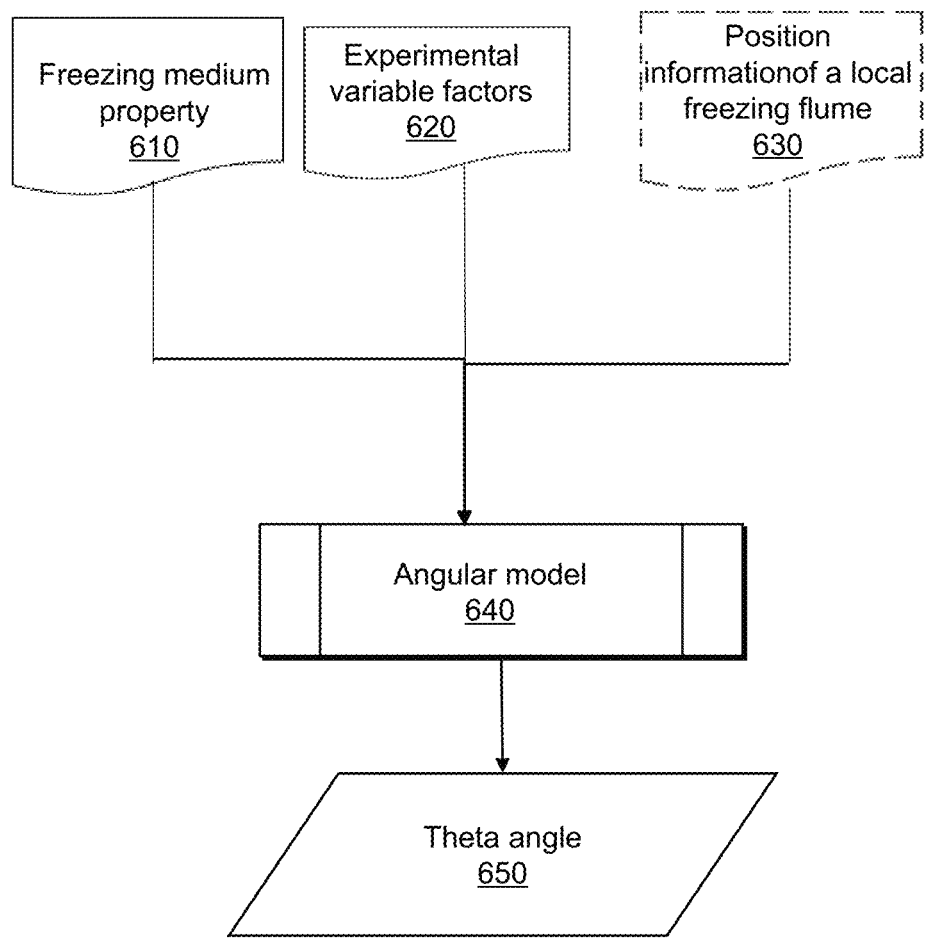
FIG. 6 is an exemplary schematic diagram of an angular model according to some embodiments of the present disclosure.

FIG. 6 is an exemplary schematic diagram of an angular model according to some embodiments of the present disclosure.

In some embodiments, as shown in FIG. 6, the processor may determine a theta angle 650 based on a freezing medium property 610 and experimental variable factors 620 using an angular model 640. A description of the experimental variable factors can be found in connection with FIGS. 1-5.

The freezing medium property refers to a composition of the freezing medium. For example, the freezing medium property may be liquid nitrogen, dry ice, a brine mixture, or the like, or a pure substance of liquid nitrogen. A description of the freezing medium and the theta angle can be found in FIGS. 1-5.

The angular model 640 is used to determine the theta angle. In some embodiments, the angular model may be a machine learning model, for example, the angular model may be a Convolutional Neural Network (CNN) model, a Neural Network (NN) model, or the like.

An input to the angular model may include the freezing medium property and experimental variable factors, and an output may include the theta angle.

In some embodiments, the angular model may be obtained by training with a large number of labeled first training samples. Each of the first training samples may include a sample freezing medium property and sample experimental variable factors. In some embodiments, the first training samples may be obtained from historical data, for example, the freezing medium properties and the experimental variable factors from historical experiments may be used as sample data. In some embodiments, for each of the first training samples, numerous CT irradiations at different angles (e.g. 10°, 20°, 30°, etc.) may be performed on the independent sediment bodies, and after the irradiations are completed, 3D reconstruction is performed. The processor may choose a maximum angle at which the reconstruction effect meets an accuracy requirement as the label. The 10°, 20°, 30° are just examples, and the angles for performing CT irradiations may be randomly generated or set by the experimenter based on experience. The accuracy requirement refers to an ability to clearly observe the layering and direction of the sediment body when irradiated at a specified angle. It should be noted that higher accuracy is not always better. Under a premise of meeting the accuracy requirement, selecting a maximum angle as the label allows for fewer irradiations and reduces costs.

During model training of the angular model, a plurality of labeled first training samples may be input into an initial angular model. A loss function is constructed based on the labels and the results of the initial angular model, and parameters of the initial angular model are iteratively updated using the loss function. The model training is completed when the loss function of the initial angular model satisfies a preset condition, and the trained angular model is obtained. The preset condition may include the convergence of the loss function, the count of iterations reaching a threshold, etc.

In some embodiments, the input to the angular model 640 may also include position information of the local freezing flume 630. For a description of the local freezing flume, please refer to FIGS. 1-5.

The position information of the local freezing flume refers to a position of the local freezing flume within the flume. For example, the position information of the local freezing flume may be a distance between a center position of the local freezing flume and a center position of the flume. The smaller the distance, the closer the local freezing flume is to the center of the flume.

In practical applications, since different positions may have different accuracy requirements for the sediment body structures, the position information of the local freezing flume is used as an input to the angular model, taking into account the differences in accuracy requirements at different positions. By using the theta angle output in this way for 3D reconstruction, it is possible to meet the needs of experimenters in observing the sediment body structures at different positions.

In some embodiments of the present disclosure, determining the theta angle based on the angular model can reduce the amount of manual computation and improve the efficiency of computation, and at the same time, utilizing a large amount of historical data to train the model can make the obtained theta angle more accurate and reliable.

In some embodiments, the device for fine reconstruction of a sedimentation structure of a flume may further include a robotic arm. After completing the flume sedimentation experiment, the plurality of local freezing flumes are pressed by the robotic arm against the flume base loaded with the sediment body to cut the independent sediment bodies out. A description of the independent sediment bodies can be found in related content of FIGS. 1-5.

In some embodiments, the local freezing flume may be fixed directly above the flume or may be located on a flat surface near the flume. When a cut is required, the robotic arm performs an operation of moving and pressing the local freezing flume.

The pressing force and cutting speed performed by the robotic arm may be preset by those skilled in the art based on experience, which is more stable and controllable compared to human pressing, and can effectively minimize the damage of the cutting on the sediment body.

In some embodiments, the pressing force and cutting speed of the robotic arm may be determined based on a degree of wetness and porosity of the sediment body.

The degree of wetness refers to a degree of wetness of the sediment body after the experiment is completed. The degree of wetness of the sediment body changes over time because water continues to evaporate. The degree of wetness may be expressed as a specific numerical value (e.g., 70%, 80%, etc.). In some embodiments, the degree of wetness of the sediment body may be obtained in any feasible manner. For example, the sediment body may be obtained through observational manners or contact angle measurements or quantified based on the time between the completion of the experiment and the start of cutting.

The porosity refers to a proportion of a pore volume in the sediment body to a volume of the sediment body. The porosity may be expressed as a specific numerical value (e.g., 50%, 60%, etc.). In some embodiments, the porosity may be obtained in any feasible manner. For example, it may be obtained through gas displacement or mercury compression manners.

The processor may determine the pressing force and the cutting speed of the robotic arm in a variety of ways based on the degree of wetness and the porosity of the sediment body. In some embodiments, the pressing force and cutting speed of the robotic arm may be obtained based on a pre-determined relationship table. For example, the pressing force and cutting speed of the robotic arm corresponding to different degrees of wetness and porosity may be preset, and then the pre-determined relationship table may be looked up to find a pressing force and cutting speed corresponding to the degree of wetness and porosity of the sediment body measured at the end of the current experiment.

Figure 7:
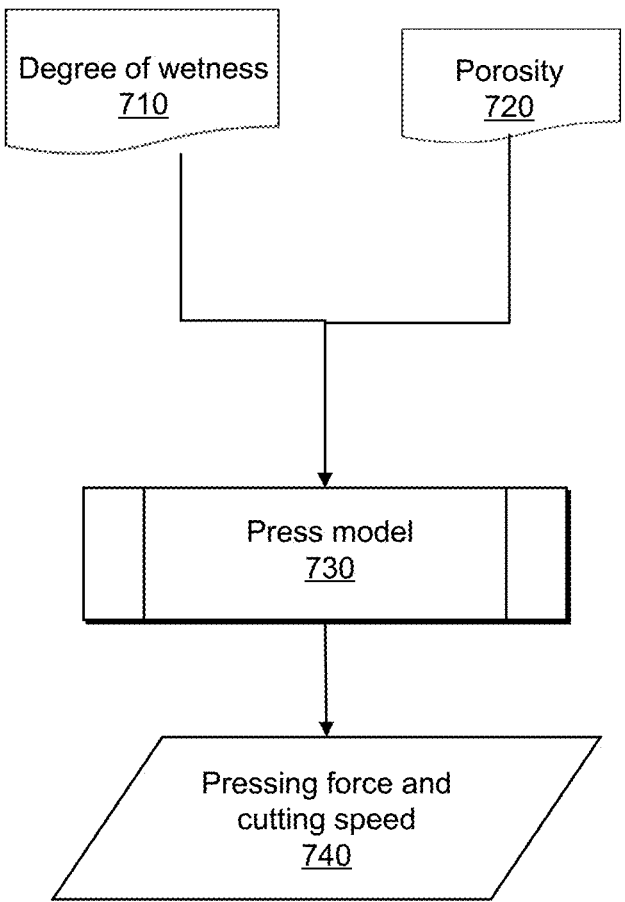
FIG. 7 is an exemplary schematic diagram of a press model according to some embodiments of the present disclosure.

FIG. 7 is an exemplary schematic diagram of a press model according to some embodiments of the present disclosure.

In some embodiments, as shown in FIG. 7, the processor may determine a pressing force and a cutting speed 740 of a robotic arm based on a degree of wetness 710 and porosity 720 of a sediment body by a press model 730.

The press model 730 is used to determine the pressing force and the cutting speed of the robotic arm. In some embodiments, the press model may be a machine learning model, such as a Convolutional Neural Network (CNN) model, a Neural Network (NN) model, or the like.

An input to the press model may include the degree of wetness and the porosity of the sediment body, and an output may include the pressing force and the cutting speed of the robotic arm.

In some embodiments, the press model may be trained based on a large number of labeled second training samples. The second training samples may include a sample degree of wetness and sample porosity of a sample sediment body. The labels may include a sample pressing force and a sample cutting speed of the sample sediment body. In some embodiments, the second training samples may be obtained from historical data. For example, a degree of wetness and porosity of the sediment body at a beginning of a cutting process in historical experiments may be used as sample data. With the same degree of wetness and porosity, the sediment body may be cut with different pressing forces and different cutting speeds. Therefore, in some embodiments, a pressing force and a cutting speed corresponding to a cut surface (observed in CT scanning) of an independent sediment body without deformation or collapse after cutting may be selected as a label corresponding to the sample degree of wetness and sample porosity of the sample sediment body.

The training process of the press model is similar to that for the angular model shown in FIG. 6 and will not be described here.

In some embodiments of the present disclosure, by using a robotic arm to perform pressing, and determining the pressing force and cutting speed based on the properties of the sediment body itself, computational efficiency may be improved, thereby effectively reducing damage to the sediment body during cutting.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. A device for fine reconstruction of a sedimentation structure of a flume, comprising:
   a combined bottom plate and a combined freezing flume, wherein
   the combined bottom plate is formed by tiling and splicing a plurality of equal-thickness and rectangular basic bottom plates, a splicing gap is located between adjacent basic bottom plates, the splicing gap is filled with elastic adhesive, and the filled splicing gap is as thick as the basic bottom plates;
   the combined freezing flume includes a plurality of local freezing flumes; each of the plurality of local freezing flumes includes:

a rectangular flume body with an open bottom and a hollow interior, at least two channels located on a top surface of the rectangular flume body and communicating with the hollow interior, wherein any one of the at least two channels is used for a freezing medium to enter, and another of the at least two channels is used for the freezing medium to flow out, and three metal particles with different diameters located on the top surface of the rectangular flume body at different positions from the two channels;

each of the basic bottom plates has a local freezing flume that matches the basic bottom plate, the local freezing flume that matches the basic bottom plate satisfies that: a thickness of the rectangular flume body is sw/2, a length of the rectangular flume body is LL+sw/2, and a width of the rectangular flume body is LW+sw/2, where sw represents a width of the splicing gap located between the adjacent basic bottom plates, LL represents a length of the each of the basic bottom plates, and LW represents a width of the each of the basic bottom plates.

2. The device according to claim 1, wherein a size of the each of the basic bottom plates in the combined bottom plate is the same; correspondingly, in the combined freezing flume, a size of the rectangular flume body of the each of the plurality of local freezing flumes is the same.

3. The device according to claim 1, wherein a plurality of splicing gaps have a same width, and the width sw satisfies: 0<sw<2 mm.

4. The device according to claim 1, wherein the diameters of the three metal particles satisfy: a diameter of any one of the metal particles is pw, then the diameters of the other two metal particles are 2*pw and 4*pw, respectively.

5. The device according to claim 1, wherein an elastic coefficient of the elastic adhesive satisfies: when a thickness of a sediment on the flume reaches a maximum thickness of the flume, an elastic deformation of the elastic adhesive is less than 0.0001.

6. A method for fine reconstruction of a sedimentation structure of a flume using the device described in claim 1, comprising:

dividing a sediment body located on the combined bottom plate and completed a flume sedimentation experiment through the plurality of local freezing flumes to obtain a plurality of independent sediment bodies, each of the independent sediment bodies located on the each of the basic bottom plates and covered by the flume body of the local freezing flume;

recording positions of the independent sediment bodies on the combined bottom plate under a unified coordinate system to obtain a first position relationship, and recording spatial positions of the three metal particles of the local freezing flume to obtain a second position relationship;

performing quick freezing on the independent sediment bodies through the local freezing flumes to obtain frozen sediment bodies;

for each of the frozen sediment bodies, obtaining CT scan data of the frozen sediment body at different rotation angles, and forming a slice dataset of the frozen sediment body from CT scan data within a rotation angle range of 0-360°;

obtaining three-dimensional sedimentary structure data by performing a Jordanian transformation on the slice dataset of the frozen sediment body;

identifying, from the three-dimensional sedimentary structure data, the spatial positions of the three metal particles on the local freezing flume of the frozen sediment body to obtain a third position relationship;

obtaining a correspondence between the three-dimensional sedimentary structure data and the frozen sediment body by aligning the second position relationship and the third position relationship;

splicing three-dimensional sedimentary structure data corresponding to the plurality of frozen sediment bodies according to the first position relationship to obtain a three-dimensional experiment sedimentation structure of the flume.

7. The method according to claim 6, wherein the quick freezing is performed based on liquid nitrogen.

8. The method according to claim 6, further comprising:

dividing a sediment body located on the combined bottom plate and completed a flume sedimentation experiment through the plurality of local freezing flumes to obtain a plurality of independent sediment bodies, each of the independent sediment bodies located on the each of the basic bottom plates and covered by the flume body of the local freezing flume;

injecting the freezing medium through the any one of the at least two channels to quickly freeze the independent sediment bodies to obtain the frozen sediment bodies, labeling the frozen sediment bodies including:

in a Cartesian coordinate system, recording spatial positions of three mark points formed by three metal particles on a local freezing flume Pi of an i-th frozen sediment body using a laser three-dimensional positioning technology, wherein with a straight edge of the flume as an origin point, a vertical direction as a Z direction, and other two edges as an X direction and a Y direction, a spatial position of a TD mark point is recorded as Di={Pi_DX,Pi_DY,Pi_DZ}, a spatial position of a TE mark point recorded as Ei={Pi_EX,Pi_EY,Pi_EZ}, a spatial position of a TF mark point recorded as Fi={Pi_FX,Pi_FY,Pi_FZ}, where Pi_DX, Pi_EX, and Pi_FX are coordinates of the three mark points in the X direction, Pi_DY, Pi_EY, and Pi_FY are coordinates of the three mark points in the Y direction, and Pi_DZ, Pi_EZ, and Pi_FZ are coordinates of the three mark points in the Z direction;

a coordinate information set Ci={Di, Ei, Fi} of the i-th local freezing flume Pi is composed of the spatial positions of the three mark points Di, Ei and Fi of the i-th local freezing flume Pi; a set of spatial position information of mark points of all N local freezing flumes constitutes a spatial coordinate label set S={Ci|i=1 . . . N};

putting the i-th frozen sediment body after completing the labeling into a rotating CT scanner, irradiating the frozen sediment body once with a rotation of theta angle, and obtaining scan data Tk under each irradiation as slice data under different rotation angles, after completing a rotation of 360°, obtaining 360/theta pieces of slice data, and forming a slice information set {Tk|k=1 . . . 360/theta} in order;

based on the slice information set, performing the Jordanian transformation to obtain the three-dimensional sedimentary structure data CTi of the i-th frozen sediment body;

identifying coordinate data corresponding to the three mark points from the three-dimensional sedimentary structure data CTi, where a Di point is an origin point, a Di-TE edge is an X-axis, and a Di-TF edge is a Y-axis;

extracting the coordinate information set $C_i=\{D_i, E_i, F_i\}$ of the i-th local freezing flume from the spatial coordinate label set $S=\{C_i | i=1 \ldots N\}$, extracting TD mark point coordinate $D_i=\{P_{i\_DX}, P_{i\_DY}, P_{i\_DZ}\}$ and TE mark point coordinate $E_i=\{P_{i\_EX}, P_{i\_EY}, P_{i\_EZ}\}$ in the i-th frozen sediment body to form a coordinate system, according to a local coordinate $CT\_D_i=\{CT_{i\_DX}, CT_{i\_DY}, CT_{i\_DZ}\}$ of the TD mark point and a local coordinate $CT\_E_i=\{CT_{i\_EX}, CT_{i\_EY}, CT_{i\_EZ}\}$ of the TE mark point identified from the three-dimensional sedimentary structure data $CT_i$, splicing the three-dimensional sedimentary structure $CT_i$ to obtain three-dimensional reconstructed body data F of the sedimentation structure of the flume.

* * * * *